United States Patent
Cordova et al.

[11] Patent Number: 5,870,194
[45] Date of Patent: *Feb. 9, 1999

[54] GYRO SENSOR COIL WITH FILLED OPTICAL FIBER

[75] Inventors: Amado Cordova; John P. Rahn, both of West Hills, Calif.

[73] Assignee: Litton Systems, Inc., Woodland Hills, Calif.

[*] Notice: The term of this patent shall not extend beyond the expiration date of Pat. No. 5,668,908.

[21] Appl. No.: 904,926

[22] Filed: Aug. 1, 1997

[51] Int. Cl.⁶ .................................................. G01C 19/72
[52] U.S. Cl. .................................... 356/350; 385/123
[58] Field of Search ................... 356/350; 242/333.6; 385/12, 123, 128

[56] References Cited

U.S. PATENT DOCUMENTS

| | | |
|---|---|---|
| 4,699,451 | 10/1987 | Mohr . |
| 4,793,708 | 12/1988 | Bednarz . |
| 4,856,900 | 8/1989 | Ivancevic . |
| 5,260,768 | 11/1993 | Cordova et al. . |
| 5,333,214 | 7/1994 | Huang et al. . |
| 5,371,593 | 12/1994 | Cordova et al. . |
| 5,486,922 | 1/1996 | Cordova . |
| 5,545,892 | 8/1996 | Bilinski et al. . |
| 5,546,482 | 8/1996 | Cordova et al. . |
| 5,668,908 | 9/1997 | Cordova ................................ 356/128 |

OTHER PUBLICATIONS

N. J. Frigo, "Compensation of Linear Sources of Non–reciprocity in Sagnac Interferometers", *Fiber Optics and Laser Sensors I*, proc. SPIE vol. 412, p. 268 (1983).

D. M. Shupe, "Thermally Induced Nonreciprocity in the Fiber Optic Interferometer," *Applied Optics*, vol. 19(5), pp. 654–655 (1980).

*Primary Examiner*—Samuel A. Turner
*Attorney, Agent, or Firm*—Elliott N. Kramsky

[57] ABSTRACT

A sensor coil for a fiber optic gyroscope includes fiber with an inner jacket of predetermined composition for reducing the effects of temperature-change-induced optical length asymmetry upon bias stability. Filler material of predetermined composition is combined with silicone and deposited upon the glass fiber, forming an inner jacket. The composition of the inner jacket is adjusted to thereby effect the Poisson ratio of the inner jacket and thereby reduce the isotropic thermally-induced pressure within the wound coil resulting in reduced temperature-induced optical length asymmetry and improved bias stability.

18 Claims, 2 Drawing Sheets

GYRO SENSOR COIL WITH FILLED OPTICAL FIBER

BACKGROUND

1. Field of the Invention

The present invention relates to fiber optic gyroscopes. More particularly, this invention pertains to a sensor coil design that addresses the effects of temperature-change-induced optical length asymmetry upon bias stability.

2. Description of the Prior Art

An interferometric fiber optic gyroscope comprises the following main components: (1) a light source, (2) two beamsplitters (fiber optic directional coupler and/or integrated-optics Y-junctions) to satisfy the requirement of a "minimum reciprocal configuration" (S. Ezekiel and M. J. Arditty, *Fiber Optic Rotation Sensors* New York, Springer-Verlag p. 2–26 1982), (3) a fiber sensing optic coil made of either polarization maintaining (PM) fiber or low-birefringence fiber, (4) a polarizer (and sometimes one or more depolarizers), and (5) a detector. Light from the light source is split by the loop beamsplitter into copropagating and counterpropagating waves travelling in the sensing coil. The associated electronics measures the phase relationship between the two interfering, counter-propagating beams of light that emerge from opposite ends of the coil. The difference between the phase shifts experienced by the two beams is proportional to the rate of rotation of the platform to which the instrument is fixed, due to the well-known Sagnac effect.

Environmental factors can affect the measured phase shift difference between the counterpropagating beams, thereby introducing a bias error. Such environmental factors include variables such as temperature, vibration (acoustical and mechanical) and magnetic fields. In general, such factors are both time-varying and unevenly distributed throughout the coil. These environmental factors induce variations in the optical light path that each counterpropagating wave encounters as it travels through the coil. The phase shifts induced upon the two waves are unequal, producing a net undesirable phase shift which is indistinguishable from the rotation-induced signal.

One approach to reducing bias sensitivities arising from environmental factors has involved the use of various symmetric coil winding configurations. In such coils, the windings are arranged so that the geometrical center of the coil is located at the innermost layer while the two ends of the coil are located at the outermost layers.

N. Frigo has proposed the use of particular winding patterns to compensate for non-reciprocities in "Compensation of Linear Sources of Non-Reciprocity in Sagnac Interferometers", *Fiber Optics and Laser Sensors I*, Proc. SPIE Vol. 412 p. 268 (1983). Furthermore, U.S. Pat. No. 4,793,708 of Bednarz entitled "Fiber Optic Sensing Coil" teaches a symmetric fiber optic sensing coil formed by dualpole or quadrupole winding. The coils described in that patent exhibit enhanced performance over the conventional helix-type winding.

U.S. Pat. No. 4,856,900 of Ivancevic entitled "Quadrupole-Wound Fiber Optic Sensing Coil and Method of Manufacture Thereof" teaches an improved quadrupole-wound coil in which fiber pinching and microbends due to the presence of pop-up fiber segments adjacent the end flanges are overcome by replacing such pop-up segments with concentrically-wound walls of turns for climbing between connecting layers. Both of the aforementioned United States patents are the property of the assignee herein.

While appropriate coil winding techniques minimize some of the effects of some sources of bias error in the output of a fiber optic gyro, they do not reduce the bias completely.

A large fraction of gyro bias instability results from the so-called temperature-change-induced optical length asymmetry (TCIOLA) of the fiber of the wound coil with respect to its midpoint. The largest component of TCIOLA results from thermal stress within the wound coil which increases as the temperature departs from the polymer curing temperature. (Note: the coil is nominally stress-free at the polymer curing temperature.)

While the above-described winding techniques achieve some reduction in TCIOLA induced bias effects, by arranging the coil so that fiber segments at equal distances from the midpoint of the wound fiber lie adjacent one another, high accuracy applications, such as long-duration aircraft navigation, require additional reductions in this bias factor.

SUMMARY OF THE INVENTION

The foregoing and additional shortcomings and disadvantages of the prior art are addressed by the present invention that provides, in a first aspect, a sensor coil for a fiber optic gyroscope. Such a coil includes an optical fiber. The fiber is arranged into a plurality of concentric cylindrical layers. Each of the layers comprises a plurality of turns of the fiber and each of the turns is arranged in a predetermined winding pattern. The fiber includes an inner jacket of silicone and a predetermined filler material.

In a second aspect, the invention provides a method for making a sensor coil for a fiber optic gyroscope. Such method is begun by forming an optical fiber having an inner jacket of predetermined Poisson ratio. Thereafter, such fiber is wound to form a plurality of layers of windings, each of which comprises a plurality of turns in accordance with a predetermined winding pattern.

The preceding and other features and advantages of the invention will become further apparent from the detailed description that follows. Such description is accompanied by a set of drawing figures. Numerals of the drawing figures, corresponding to those of the written text, point to the various features of this invention with like numerals referring to like features throughout.

DETAILED DESCRIPTION OF THE PREFERRED EMBODIMENT

Figure 1:
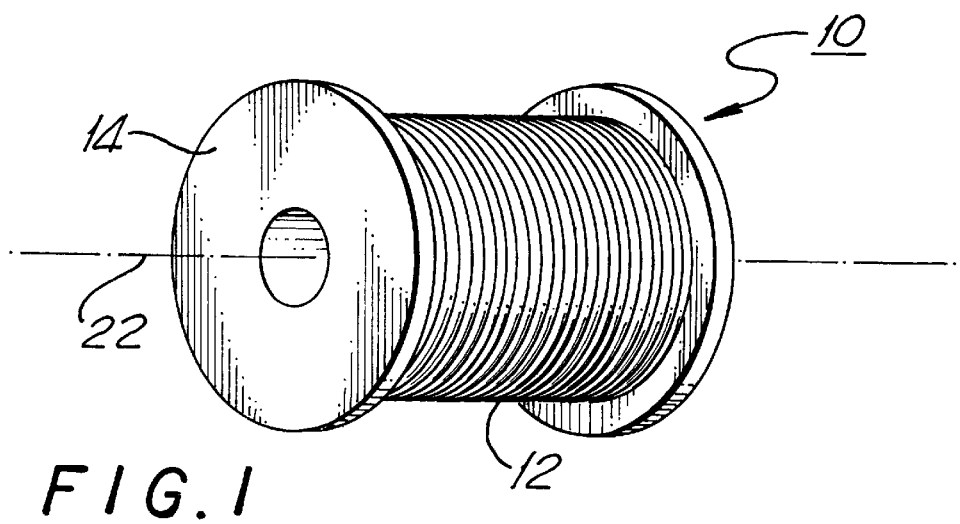
FIG. 1 is a perspective view of a sensor coil for a fiber optic gyroscope in accordance with the invention.

Turning to the drawings, FIG. 1 is a perspective view of a sensor coil 10 in accordance with the present invention. As mentioned earlier, the sensor coil 10 provides a critical element of a fiber optic gyro system. In use, it is rigidly fixed to a platform whose rotation rate is to be measured.

The sensor coil 10 comprises an optical fiber 12 that is wound upon a supportive spool 14 and serves as an optical guide for receiving a counterpropagating beam pair emitted from a common light source (not shown). The supportive spool 12 of FIG. 1 includes end flanges, the presence or absence of which forms no part of the claimed invention.

Figure 2:
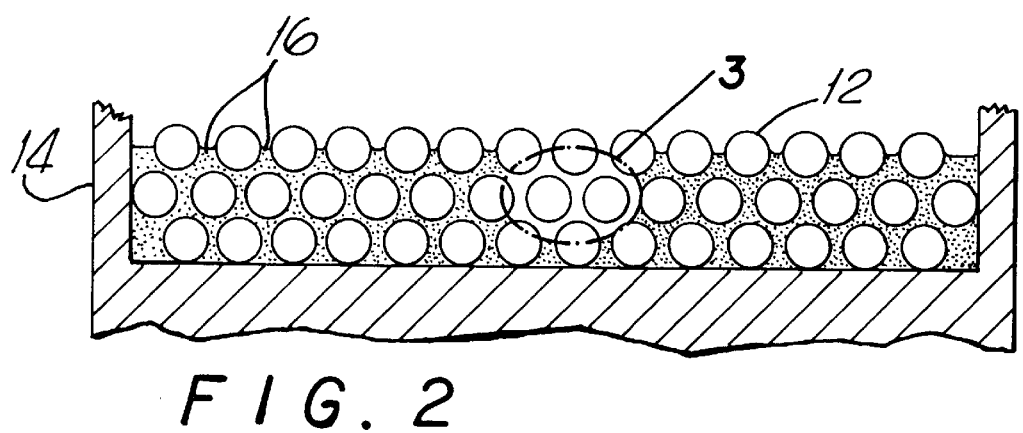
FIG. 2 is an enlarged cross-sectional view of a representative portion of the layered windings of the sensor coil.

FIG. 2 is an enlarged cross-sectional view of a representative portion of the layered windings of optical fiber 12. As can be seen, the windings of optical fiber 12 may be potted within a matrix of adhesive material 16. Generally, the presence of such adhesive material 16 provides a number of useful advantages for the gyro. These include facilitating the precision of coil winding. That is, the adhesive potting material 16 can be applied and cured layer-by-layer so that smooth surfaces will be presented for the winding of subsequent layers. Such a winding environment enhances control of the resulting coil geometry including such essential factors as inter-fiber spacing, turns per layer and layers per coil and minimizes winding defects such as "missing turns".

Various manufacturing methods can be employed to create a coil in which the turns or windings are embedded in a matrix of adhesive potting material. Such methods include, for example, application of the adhesive by means of a syringe-type dispenser followed by curing. Such methods assure that smooth surfaces will be presented for the winding of subsequent layers. A uv-curable adhesive which permits rapid hardening is most appropriate for such methods.

Other methods of manufacture include dry coil winding followed by vacuum impregnation with a very low viscosity adhesive. An alternative wet winding technique employs a thermally-curable adhesive that is applied as the coil is wound. The adhesive is left uncured (in liquid form) during winding. The completed (wound) coil is then thermally cured.

Figure 3:
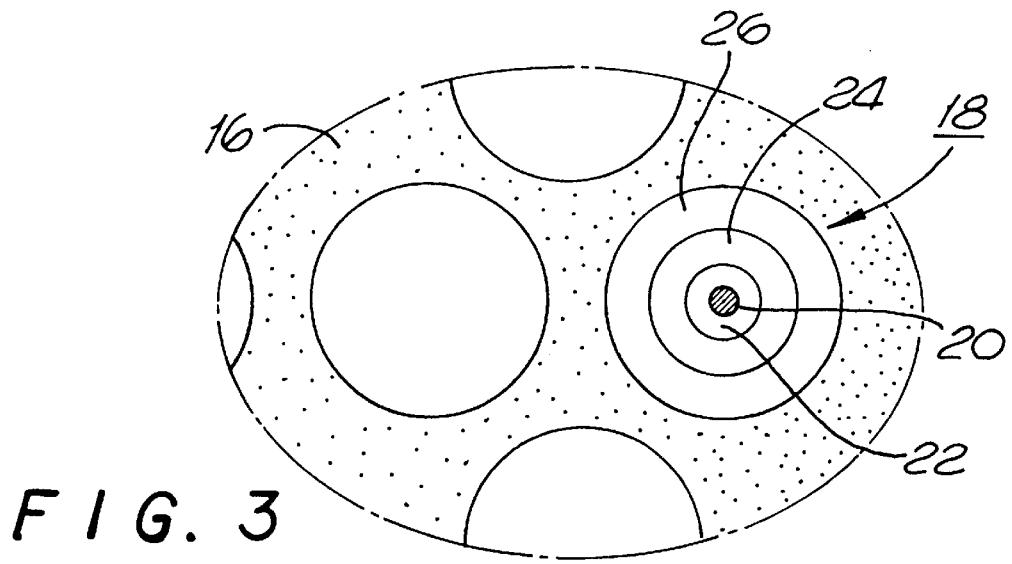
FIG. 3 is a greatly enlarged view of a portion of the wound sensor coil taken at line 3 of FIG. 2.

FIG. 3 is a greatly enlarged view of a portion of the wound coil taken at line 3 of FIG. 2. This figure presents a detailed cross-sectional view with detail substantially limited to a representative section of the optical fiber 18 whose turns form the layers of the wound coil. Referring to such detailed cross-sectional view, the fiber 18 includes a central member of glass composition comprising a core 20 and surrounding cladding 22. The glass of the core 20 is of higher refractive index than that of the surrounding cladding 22 to define an axial path of guided light transmission through the center of the optical fiber. Such defined path is subject to substantially no leakage into the surrounding fiber jacketing (discussed below). The diameter of a representative glass member is in the range of 80 microns.

An inner jacket 24 is provided for cushioning the central member from lateral stresses as it is wound or otherwise exposed to sharp edges. A silicone material is utilized for the inner jacket 24 with a representative thickness of about 30 microns. Silicones have been found to be suitable for inner jacket applications due to their desirable cushioning, and, therefore, protective qualities as well as their ability to wet glass. Such materials are based upon polymers comprised of a backbone of linked silicon-oxygen-silicon atoms. In this way they are chemically different from organic materials which are mostly based on polymers composed of a linked together backbone of carbon-to-carbon atoms.

An outer jacket or coating 26 is provided for abrasion resistance. The outer jacket 26 is formed of an acrylate such as EPOXY acrylate or polyurethane acrylate having a representative thickness of about 12.5 microns. Alternatively, for some applications only a single jacket of an acrylate is provided. However, the inclusion of an inner jacket 24 is often critical as many applications involve small radius turns requiring a softening medium for protection of the light-guiding glass member from breakage and to reduce polarization cross-coupling that can lead to polarization non-reciprocity (PNR) bias errors.

Acrylate materials possess a Poisson ratio of about 0.4 while this ratio for most polymers, which include silicones, exceeds 0.48 and extends to about 0.499.

The bulk modulus, B, of a material (stiffness for three-dimensional compression) is $$B = \frac{E}{3(1-2v)} \tag{1}$$

where E is the Young's modulus and $v$ is the Poisson ratio of the material.

From the above, it may be noted that the bulk modulus B approaches infinity when the Poisson ratio $v$ approaches 0.5.

The isotropic pressure change $\Delta p$ internal to a volume of material of coefficient of thermal expansion $\alpha$ such as silicone whose volume is confined due to a temperature change $\Delta T$ is $$\Delta p = 3\alpha \Delta T B = \alpha \Delta T \frac{E}{(1-2v)} \tag{2}$$

As in the case of the bulk modulus B, pressure becomes very large as $v$ approaches 0.5. The inventors have found that the inner jacket 24 is subject to such stressing as the soft rubbery silicone of the inner jacket 24 is confined between the very stiff glass fiber 22 and the outer jacket 26. Such restriction of volumetric deformation is further affected by the fact that, in a wound gyro sensor coil, each turn of fiber is usually immersed between many layers of windings. Thus, the structure of the wound coil also acts to restrict dimensional deformation. The inventors have further recognized that the combination of restriction upon volume deformation with the relatively high Poisson's ratio (in the vicinity of 0.5) of silicones subjects the inner jacket 24 to the generation of significant levels of isotropic pressure in response to a temperature change $\Delta T$.

The inventors have further found that significant reductions in the Poisson ratio of the material of the inner jacket 24 can be achieved by the addition of a volume fraction of fine-grained stiff filler material to the silicone as the stiff filler displaces a portion of the volume of the generally-rubbery silicone. Referring back to equation 2 above, this implies a significant reduction in the amount of isotropic inner jacket pressure P generated in response to a change in temperature $\Delta T$.

Suitable filler materials include carbon black, alumina, hafnium oxide, magnesium oxide, silica and titania powder. Each of such materials is characterized by appropriately low values of $\alpha$ and $v$ and a relatively large value of E for low expansion and high stiffness. Furthermore, each of such filler materials is capable of being formed, through either wet or dry processing into, for example, a colloidal or fumed form, of appropriate particle size. Due to the approximately 20 micron thickness of the inner jacket 24, beads or spheres of filler material having a diameter of no greater than 1 micron are preferred.

The above analysis and inferences are borne out by a comparison of the graphs of FIGS. 4(*a*) and 4(*b*). Such graphs display data generated via mathematical simulations of potted gyro sensor coils. The graph of FIG. 4(*a*) plots optical path length strain per degree C ($\epsilon_o(s)$) of a wound optical fiber whose inner jacket comprises unfilled silicone material. In contrast, the graph of FIG. 4(*b*) presents a plot of optical path length strain per degree C of fiber within a potted sensor coil formed of optical fiber having an inner jacket in accordance with the invention comprising silicone and a selected filler material.

Figure 4A:
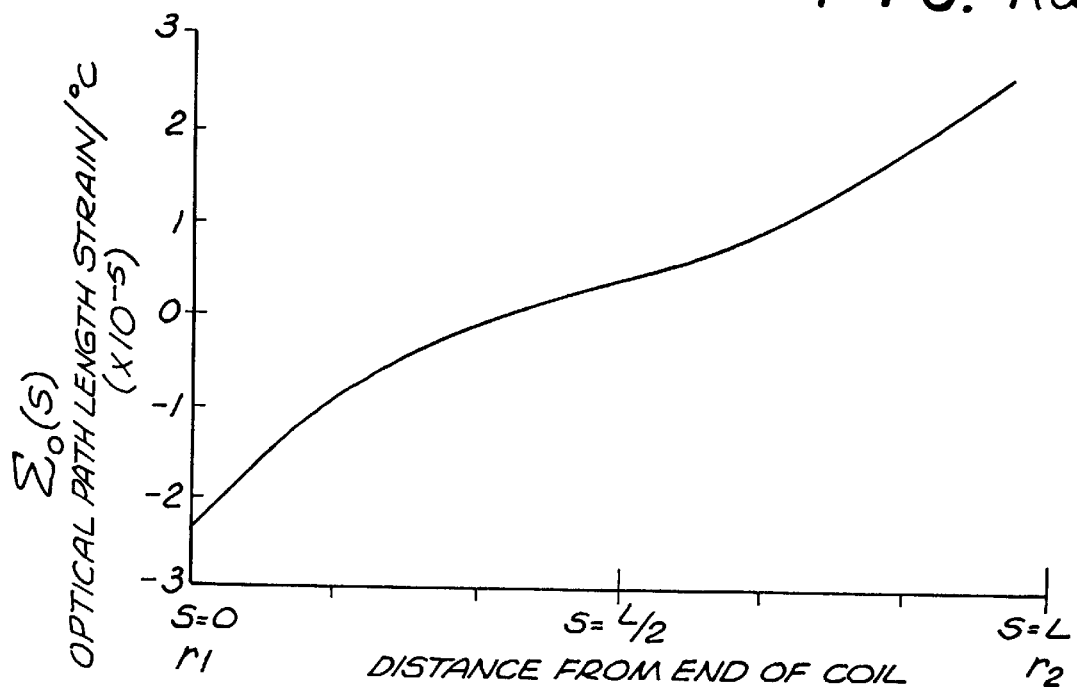
FIGS. 4(*a*) and 4(*b*) are graphs of optical path length strain per unit length of fiber for potted sensor coils wound from optical fibers whose inner jackets comprise unfilled and filled silicone material respectively.
Figure 4B:
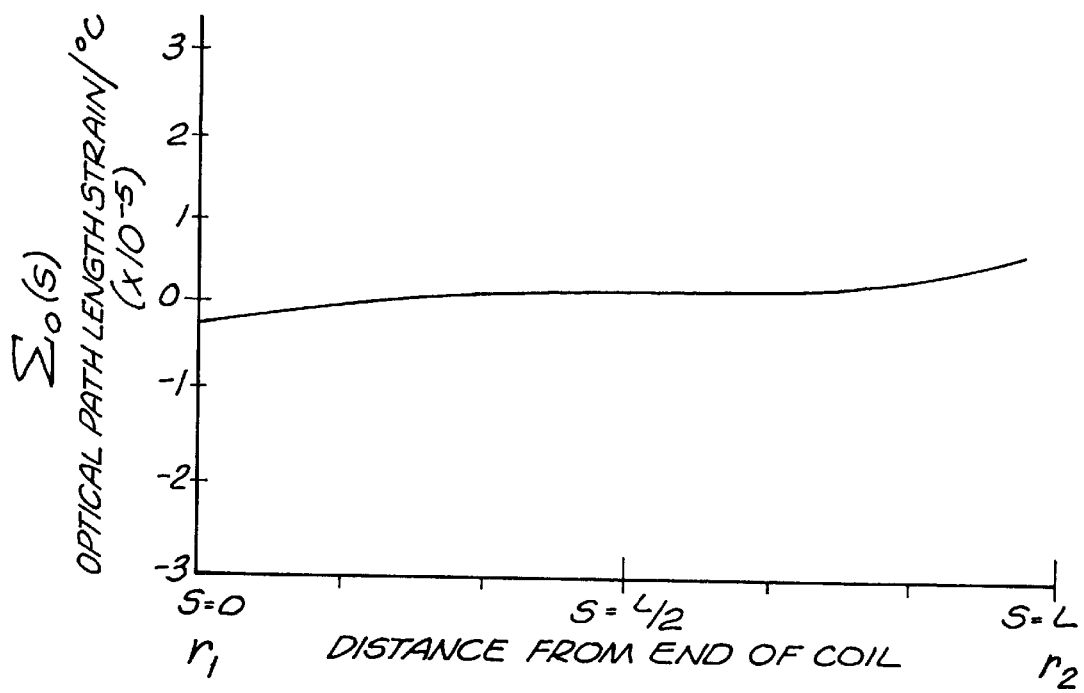

Each of the graphs of FIGS. 4(a) and 4(b) displays data for a potted coil comprising eighteen (18) layers, each of sixteen (16) turns of optical fiber. In each case, the potting compound is assumed to comprise material having a Poisson ratio of 0.40, a Young's modulus of $1.07 \times 10^7$ Pascals and an $\alpha$ of $2.1 \times 10^{-4}$ per degree C. A Young's modulus of $1.74 \times 10^6$ Pascals and an $\alpha$ of $460 \times 10^{-6}$ per degree C is assumed in each case for the inner jacket material. While $\nu$ is decreased by the addition of a stiff filler, E will increase and $\alpha$ will decrease with a net result being a decrease in pressure per equation 2 above.

The data of FIG. 4(a), modeling unfilled silicone as the inner jacket material, is based upon a Poisson's ratio of 0.4995 while that of FIG. 4(b) (silicone material including a preselected filler) is based upon a Poisson ratio of 0.460. The latter assumption has been experimentally verified by the inventors to represent a reasonable approximation of a silicone material including 25 to 35 percent carbon black filler.

Referring to the graphs in combination, it can be seen that, as one proceeds from the inner radius $r_1$ to the outer radius $r_2$ of the wound coil, the optical path length strain $\epsilon_o(s)$ per degree C varies from a negative value, indicating compression, to a positive value, indicating tension, with maximum strain occurring adjacent the radial edges of the wound coil. An absence of strain is observed near the middle of the wind as the strain undergoes a transition from compression to tension. Dramatic differences between the strains within coils formed of optical fiber possessing an inner jacket of filled and unfilled silicone may be observed from a comparison of the graphs. While the optical path length strain varies from $2.35 \times 10^{-5}$ in compression at the inner radius $r_1$ to $2.55 \times 10^{-5}$ in tension at outer radius $r_2$ for a coil formed of unfilled silicone, the corresponding values for a coil wound from fiber that includes filler material varies only in a narrow band ranging from $0.25 \times 10^{-5}$ in compression at the inner radius $r_1$ to $0.4 \times 10^{-5}$ in tension at the outer radius $r_2$. This represents an almost ten-fold reduction in optical path length strain throughout due to the introduction of filler material into the inner jacket of the wound optical coil.

The bias error $\theta_E$ due to the temperature-change-induced optical length asymmetry, or TCIOLA, discussed above may be expressed as follows:

$$\theta_E = (n_c^2 L/4NA) \int_o^L [(\epsilon_{oL}(s))(1 - 2s/L)] ds \quad (3)$$

where $\theta_E$ = error due to strain/degree C;

$n_c$ = index of refraction of fiber core;

$\epsilon_o(s)$ = optical path length strain per degree C at a distance s from end of coil;

s = distance of fiber segment from end of coil;

L = total length of fiber;

N = number of turns of wound coil; and

A = average area of each turn.

As can be seen from equation 3, optical bias $\theta_E$ is an integral function of optical path length strain as plotted in FIGS. 4(a) and 4(b). Accordingly, one can see that a substantial reduction in such bias may be realized through the introduction of appropriate filler material into the inner jacket of the optical fiber.

Thus, it is seen that the teachings of the present invention provide sensor coils that are substantially improved in terms of lessened vulnerability to bias effects due to temperature change-induced optical length asymmetry. By utilizing the teachings of the invention, one can further enhance the accuracy of the fiber optic gyroscope in the presence of environments characterized the significant changes in temperature $\Delta T$. Such environments often exist in applications requiring a high degree of accuracy, such as navigation over extended distances and times.

While this invention has been described with reference to its presently preferred embodiment, it is not limited thereto. Rather, this invention is limited only insofar as defined by the following set of patent claims and includes within its scope all equivalents thereof.

What is claimed is:

1. A sensor coil for a fiber optic gyroscope comprising, in combination;
   a) an optical fiber;
   b) said fiber being arranged into a plurality of concentric cylindrical layers;
   c) each of said layers comprising a plurality of turns of said fiber;
   d) each of said turns being arranged into a predetermined winding pattern; and
   e) said fiber including an inner jacket comprising silicone and a predetermined filler material.

2. A sensor coil as defined in claim 1 further characterized in that said filler material is less compressible than said silicone.

3. A sensor coil as defined in claim 2 wherein said filler material is of particulated form.

4. A sensor coil as defined in claim 3 wherein said filler material comprises carbon black.

5. A sensor coil as defined in claim 3 wherein said filler material comprises alumina.

6. A sensor coil as defined in claim 3 wherein said filler material comprises hafnium oxide.

7. A sensor coil as defined in claim 3 wherein said filler material comprises magnesium oxide.

8. A sensor coil as defined in claim 3 wherein said filler material comprises silica.

9. A sensor coil as defined in claim 3 wherein said filler material comprises titania powder.

10. A sensor coil as defined in claim 1 further including:
    a) said filler comprising material characterized by a Poisson ratio of less than 0.48;
    b) an outer jacket covering said inner jacket of said fiber; and
    c) said outer jacket comprising material characterized by a Poisson ratio of less than 0.48.

11. A sensor coil as defined in claim 10 encapsulated with a potting material.

12. A sensor coil as defined in claim 11 wherein said outer jacket comprises acrylate material.

13. A sensor coil as defined in claim 10 wherein said filler material comprises particulated material chosen from the group consisting of carbon black, alumina, hafnium oxide, magnesium oxide, silica and titania powder.

14. A method for making a sensor coil for a fiber optic gyroscope comprising the steps of:
    a) forming an optical fiber having an inner jacket of predetermined Poisson ratio; and then
    b) winding said fiber to form a plurality of layers of windings, each of said layers of windings comprising a plurality of turns of said fiber in accordance with a predetermined winding pattern.

15. A method as defined in claim 14 wherein the step of forming an optical fiber further includes the step of forming an inner jacket comprising filled silicone material.

16. A method as defined in claim 15 wherein the step of forming an inner jacket further includes the steps of:
   a) selecting a filler material characterized by a Poisson ratio that is less than that of said silicone; then
   b) combining said silicone and said filler material; and then
   c) depositing said combination onto the glass waveguide of said optical fiber.

17. A method as defined in claim 16 further including the step of encapsulating said coil with a potting material.

18. A method as defined in claim 17 wherein the step of selecting a filler material comprises the step of selecting a particulated material from the group of materials consisting of carbon black, alumina, hafnium oxide, magnesium oxide, silica and titania powder.

* * * * *